US009887413B2

(12) United States Patent
Choi et al.

(10) Patent No.: US 9,887,413 B2
(45) Date of Patent: *Feb. 6, 2018

(54) BATTERY PACK AND CONNECTING BAR APPLIED THERETO

(71) Applicant: LG CHEM, LTD., Seoul (KR)

(72) Inventors: Jun-Seok Choi, Daejeon (KR); Tae-Hwan Roh, Daejeon (KR); Jin-Kyu Lee, Daejeon (KR); Seong-Tae Kim, Daejeon (KR); Tae-Hyuck Kim, Daejeon (KR); Jung-Hoon Yang, Daejeon (KR); Seung-Don Choi, Daejeon (KR); Dal-Mo Kang, Daejeon (KR); Dong-Yeon Kim, Daejeon (KR)

(73) Assignee: LG CHEM, LTD., Seoul (KR)

(*) Notice: Subject to any disclaimer, the term of this patent is extended or adjusted under 35 U.S.C. 154(b) by 132 days.

This patent is subject to a terminal disclaimer.

(21) Appl. No.: 14/072,963

(22) Filed: Nov. 6, 2013

(65) Prior Publication Data

US 2014/0065467 A1   Mar. 6, 2014

Related U.S. Application Data

(63) Continuation of application No. PCT/KR2013/000024, filed on Jan. 3, 2013.

(30) Foreign Application Priority Data

Jan. 3, 2012  (KR) .................. 10-2012-0000709
Jan. 3, 2013  (KR) .................. 10-2013-0000470

(51) Int. Cl.
H01M 2/34      (2006.01)
H01M 2/20      (2006.01)
(Continued)

(52) U.S. Cl.
CPC ......... *H01M 2/347* (2013.01); *H01M 2/1061* (2013.01); *H01M 2/1077* (2013.01);
(Continued)

(58) Field of Classification Search
USPC .......................................... 429/158
See application file for complete search history.

(56) References Cited

U.S. PATENT DOCUMENTS 3,288,968 A * 11/1966 Feenan ................. H01H 69/02
                                                    337/295
5,435,968 A    7/1995 Panthofer
(Continued)

FOREIGN PATENT DOCUMENTS

CN    101088182 A    12/2007
CN    101253662 A    8/2008
(Continued)

OTHER PUBLICATIONS

International Search Report issued PCT/KR2013/000024, dated Apr. 22, 2013.
Written Opinion issued PCT/KR2013/000024, dated Apr. 22, 2013.

Primary Examiner — Miriam Stagg
Assistant Examiner — Victoria Lynch
(74) Attorney, Agent, or Firm — Birch, Stewart, Kolasch & Birch, LLP

(57) ABSTRACT

A battery pack includes a plurality of battery modules, each having at least one unit cell, a case for accommodating the unit cell and a bus bar electrically connected to the unit cell, and a connecting bar for connecting battery modules adjacent to each other among the plurality of battery modules, wherein at least one of the connecting bars includes a first metal plate, a second metal plate spaced apart from the first metal plate, and a metal bridge configured to connect the first metal plate and the second metal plate and having a lower melting point than the metal plate. In this configura- (Continued)

tion, if an overcurrent flows at the battery pack, the connecting bar is easily broken, thereby ensuring safety of the battery pack in use.

11 Claims, 14 Drawing Sheets

(51) Int. Cl.
*H01M 2/30* (2006.01)
*H01M 2/26* (2006.01)
*H01M 2/10* (2006.01)
*H01M 10/0525* (2010.01)
*H01R 11/28* (2006.01)

(52) U.S. Cl.
CPC ........ *H01M 2/204* (2013.01); *H01M 2/206* (2013.01); *H01M 2/266* (2013.01); *H01M 2/30* (2013.01); *H01M 2/348* (2013.01); *H01M 10/0525* (2013.01); *H01R 11/288* (2013.01); *H01M 2200/101* (2013.01); *H01M 2200/103* (2013.01); *Y02T 10/7011* (2013.01)

(56) References Cited

U.S. PATENT DOCUMENTS

| | | | |
|---|---|---|---|
| 6,377,432 B1* | 4/2002 | Hashimoto | H01H 85/36 361/103 |
| 6,622,375 B1 | 9/2003 | Endo et al. | |
| 7,687,192 B2* | 3/2010 | Yoon | H01M 2/1083 180/68.5 |
| 8,587,401 B2 | 11/2013 | Tong et al. | |
| 2005/0040926 A1 | 2/2005 | Ely et al. | |
| 2006/0170396 A1 | 8/2006 | Ha et al. | |
| 2006/0246773 A1 | 11/2006 | Yoon et al. | |
| 2007/0019351 A1 | 1/2007 | Whitney et al. | |
| 2009/0159311 A1 | 6/2009 | Zheng et al. | |
| 2009/0159347 A1* | 6/2009 | Zhou | H01M 10/615 180/65.1 |
| 2009/0297892 A1 | 12/2009 | Ijaz et al. | |
| 2010/0073005 A1 | 3/2010 | Yano et al. | |
| 2010/0196752 A1 | 8/2010 | Yue et al. | |
| 2010/0297482 A1 | 11/2010 | Yoon et al. | |
| 2011/0008655 A1 | 1/2011 | White | |
| 2011/0057761 A1* | 3/2011 | Wang | H01H 85/0241 337/297 |
| 2011/0104555 A1* | 5/2011 | Han | H01M 2/1077 429/159 |
| 2012/0126929 A1 | 5/2012 | Tong et al. | |
| 2012/0183781 A1* | 7/2012 | Chuma | C08L 63/00 428/418 |
| 2013/0078487 A1 | 3/2013 | Shin et al. | |
| 2013/0078500 A1 | 3/2013 | Takami et al. | |

FOREIGN PATENT DOCUMENTS

| | | |
|---|---|---|
| CN | 201430115 Y | 3/2010 |
| CN | 101960650 A | 1/2011 |
| JP | 2002-190288 A | 7/2002 |
| JP | 2008-533661 A | 8/2008 |
| JP | 2011-504285 A | 2/2011 |
| JP | 2011-508389 A | 3/2011 |
| KR | 10-2008-0100980 A | 11/2008 |
| KR | 10-2009-0007337 A | 1/2009 |
| KR | 10-2010-0034695 A | 4/2010 |
| KR | 10-2010-0134111 A | 12/2010 |
| WO | WO 2009/079961 A1 | 7/2009 |
| WO | WO 2010/133176 A1 | 11/2010 |
| WO | WO 2011/126315 A2 | 10/2011 |
| WO | WO 2011/134416 A1 | 11/2011 |

* cited by examiner

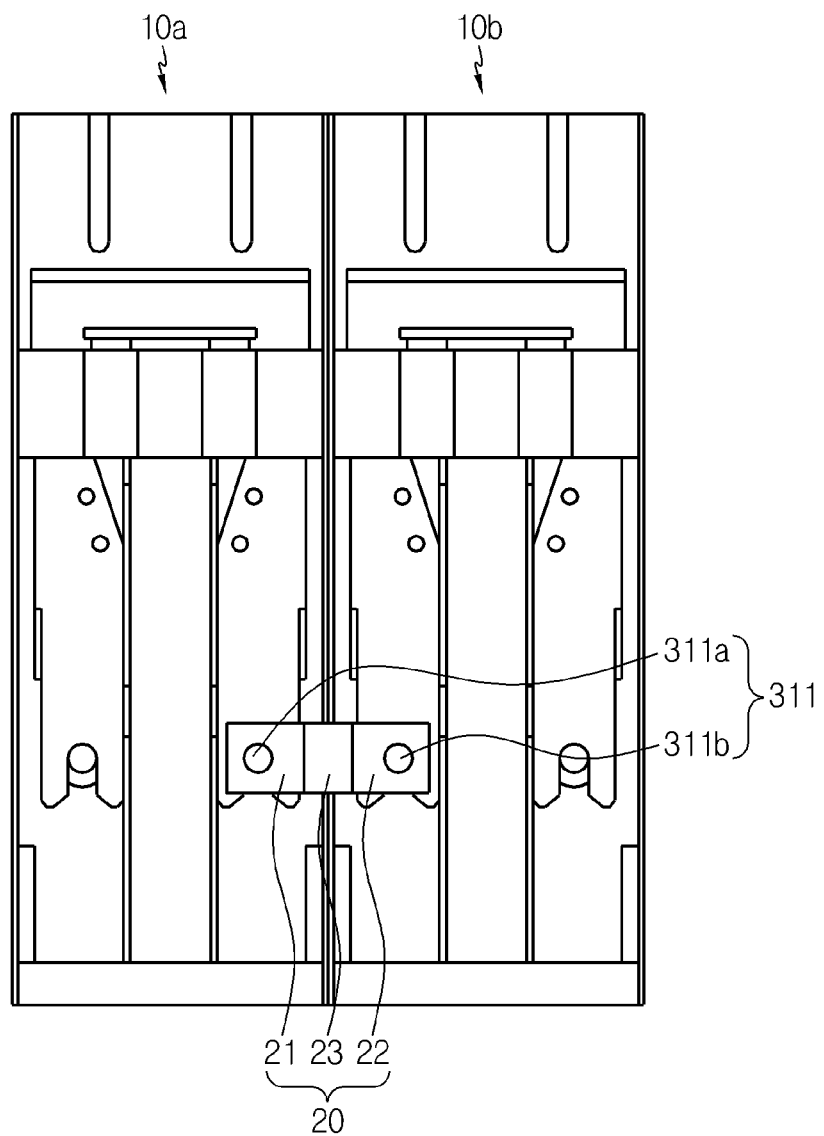

US 9,887,413 B2

BATTERY PACK AND CONNECTING BAR APPLIED THERETO

CROSS-REFERENCE TO RELATED APPLICATION

The present application is a continuation of International Application No. PCT/KR2013/000024 filed on Jan. 3, 2013, which claims priority to Korean Patent Application No. 10-2012-0000709 filed on Jan. 3, 2012, and Korean Patent Application No. 10-2013-0000470 filed on Jan. 3, 2013, in the Republic of Korea, the disclosures of which are incorporated herein by reference.

TECHNICAL FIELD

The present disclosure relates to a battery pack with improved safety at a short circuit and a connecting bar applied thereto, and more particularly, to a battery pack having an improved structure to prevent explosion and/or firing caused by the increase of temperature in a battery due to a short circuit and a connecting bar applied thereto.

BACKGROUND ART

As portable electric products such as video cameras, portable phones and portable PC are more actively used, the importance of a secondary battery generally used as a driving source of such a portable electric product is increasing.

Different from a primary battery which may not be charged, a secondary battery allows charging and discharging and is actively studied in high-tech industries such as digital cameras, cellular phones, laptop computers, power tools, electric bicycles, electric vehicles, hybrid vehicles, mass-capacity power storage device or the like.

In particular, the use of a lithium secondary battery is gaining since it has a high energy density per unit weight and allows rapid charging in comparison to other existing secondary batteries such as lead storage batteries, nickel-cadmium batteries, nickel-hydrogen batteries, nickel-zinc batteries or the like.

The lithium secondary battery has an operating voltage of 3.6V or above and is used as a power source of a portable electronic device. In other cases, a plurality of batteries are connected in series or in parallel and used for high-power electric vehicles, hybrid vehicles, power tools, electric bicycles, power storage devices, UPS or the like.

The lithium secondary battery has a triple operating voltage in comparison to nickel-cadmium batteries or nickel-metal hydride batteries and is used more and more due to its high energy density per unit weight.

Depending on the kind of electrolyte, a lithium secondary battery may be classified into a lithium ion battery using a liquid electrolyte and a lithium ion polymer battery using a solid electrolyte. In addition, depending on the kind of polymer solid electrolyte, the lithium ion polymer battery may be classified into an all solid lithium ion polymer battery containing no electrolyte and a lithium ion polymer battery using a gel-type polymer electrolyte containing an electrolyte.

Lithium ion batteries using a liquid electrolyte mostly use a cylindrical or rectangular metal can as a container and are sealed therein by welding. A can type secondary battery using such a metal can as a container has a fixed shape and thus limits the design of an electric product which uses the battery as a power source. In addition, it is difficult to decrease the volume of the product. Therefore, a pouch type secondary battery prepared by putting an electrode assembly and an electrolyte into a pouch package made of a film and then sealing the same has been developed and used.

However, the lithium secondary battery may explode when being overheated, and so issues of ensuring safety is of major concern. The lithium secondary battery may be overheated due to various factors, of which an example is a case in which an overcurrent exceeding a limit flows through the lithium secondary battery. If an overcurrent flows, the lithium secondary battery generates Joule's heat and thus an internal temperature of the battery rapidly increases. In addition, the rapid increase of temperature causes a decomposition reaction of the electrolyte and thermal runaway, which may lead to explosion of the battery. An overcurrent may occur when a sharp metallic matter pierces the lithium secondary battery, when an insulation between a cathode and an anode breaks due to the shrinkage of a separator interposed between the cathode and the anode, when a rush current is applied to the battery due to an abnormal charging circuit or a load connected to the outside, or the like.

Therefore, the lithium secondary battery is coupled to a protection circuit in order to protect the battery against abnormal states such as the occurrence of an overcurrent. The protection circuit generally includes a fuse element which irreversibly disconnects a line where a charging or discharging current flows when an overcurrent occurs.

FIG. 1 is a circuit diagram for illustrating an arrangement and an operating mechanism of a fuse element employed in a protection circuit coupled to a battery pack which includes a lithium secondary battery.

As shown in FIG. 1, a protection circuit includes a fuse element 1, a sense resistor 2 for sensing an overcurrent, a microcontroller 3 for monitoring an occurrence of an overcurrent and operating the fuse element 1 when an overcurrent occurs, and a switch 4 for switching the flow of an operating current to the fuse element 1.

The fuse element 1 is installed to a main line connected to the outermost terminal of the battery pack. The main line represents a wire through which a charging current or a discharging current flows. In FIG. 1, it is depicted that the fuse element 1 is installed at a high potential line (Pack+).

The fuse element 1 is a three-terminal element, in which two terminals are connected to the main line through which a charging or discharging current flows and one terminal is connected to the switch 4. In addition, the fuse element includes a fuse 1a connected to the main line in series and disconnected at a specific temperature and a resistor 1b for applying heat to the fuse 1a.

The microcontroller 3 monitors the occurrence of an overcurrent by periodically detecting voltages at both ends of the sense resistor 2, and turns on the switch 4 if it is determined that an overcurrent occurs. In this case, the current flowing through the main line flows to the fuse element 1 by bypassing and is applied to the resistor 1b. Accordingly, the Joule's heat generated at the resistor 1b is conducted to the fuse 1a to raise the temperature of the fuse 1a. If the temperature of the fuse 1a increases to a melting temperature, the fuse 1a is fused to irreversibly cut the main line. If the main line is cut, the overcurrent does not flow any more, which solves problems caused from the overcurrent.

However, the above techniques have several problems. For example, if the microcontroller 3 malfunctions, even though an overcurrent occurs, the switch 4 does not turn on. In this case, a current is not applied to the resistor 1b of the fuse element 1, and therefore the fuse element 1 does not operate. In addition, a space for disposing the fuse element 1 should be separately provided in the protection circuit, and a program algorithm for controlling operations of the fuse element 1 should be loaded on the microcontroller 3. Therefore, the spatial efficiency of the protection circuit deteriorates, and the load of the microcontroller 3 increases.

DISCLOSURE

Technical Problem

The present disclosure is designed to solve the problems of the prior art, and therefore it is an object of the present disclosure to provide a battery pack which may ensure safety in use by easily breaking a connecting bar which electrically connects battery modules, when a temperature increases due to the occurrence of an abnormality while the battery pack is in use, and a connecting bar applied thereto.

Technical Solution

In one aspect of the present disclosure, there is provided a battery pack, which includes a plurality of battery modules, each having at least one unit cell, a case for accommodating the unit cell and a bus bar electrically connected to the unit cell; and a connecting bar for connecting battery modules adjacent to each other among the plurality of battery modules, wherein at least one of the connecting bars includes a first metal plate; a second metal plate spaced apart from the first metal plate; and a metal bridge configured to connect the first metal plate and the second metal plate and having a lower melting point than the metal plate.

In an embodiment, the connecting bar may connect bus bars of the battery modules adjacent to each other.

Preferably, the battery pack may further include an external terminal installed at one side of the case, wherein the bus bar connects the unit cell and the external terminal.

In an embodiment, the connecting bar may connect external terminals of the battery modules adjacent to each other.

Preferably, the battery modules adjacent to each other may be connected in series or in parallel.

Preferably, the metal bridge may be a lead-free alloy containing tin (Sn) and copper (Cu) as main components.

Preferably, the content of the tin may be 80 to 98 wt %, and the content of the copper may be 2 to 20 wt %.

Preferably, the metal bridge may further include at least one additional metal selected from the group consisting of nickel (Ni), zinc (Zn) and silver (Ag).

Preferably, the content of the additional metal may be 0.01 to 10 wt %.

Preferably, the metal bridge may have a melting point of 150 to 300° C.

In an embodiment, the first metal plate and the second metal plate may be located on the same plane with a regular gap.

Preferably, the metal bridge may be joined to the first metal plate and the second metal plate on any one surface or both surfaces of the first metal plate and the second metal plate.

Preferably, the first metal plate and the second metal plate may have accommodation grooves formed in at least one of the upper and lower surfaces at one side end thereof, which face each other, and the metal bridge may be sized and shaped corresponding to the accommodation groove, and may be accommodated in a space formed by engagement of the accommodation grooves and joined to the first metal plate and the second metal plate.

Preferably, the first metal plate and the second metal plate may have a first bent portion and a second bent portion respectively formed at one side end thereof, and the metal bridge may be accommodated in a space formed by engagement of the first bent portion and the second bent portion and joined to the first metal plate and the second metal plate.

Preferably, the first metal plate and the second metal plate may have accommodation grooves formed with a predetermined depth from surfaces thereof which face each other, and both sides of the metal bridge may be respectively inserted into the accommodation grooves and joined to the metal plate.

In an embodiment, the metal bridge may be directly interposed between surfaces of the first metal plate and the second metal plate which face each other and joined to the first metal plate and the second metal plate.

Preferably, the facing surfaces may have an inclined surface tapered toward the metal soldering bridge.

In an embodiment, the first metal plate and the second metal plate may be located so that one side of the first metal plate and one side of the second metal plate face each other while overlapping each other at least partially, and the metal bridge may be interposed in the facing region and joined to the first metal plate and the second metal plate.

In an embodiment, the first metal plate and the second metal plate may be located so that one side of the first metal plate and one side of the second metal plate face each other while overlapping each other at least partially, and the metal bridge may be formed at one side and the other side of a circumference of the facing region.

In an embodiment, the first metal plate and the second metal plate may be located so that one side of the first metal plate and one side of the second metal plate face each other while overlapping each other at least partially, and the metal bridge may be formed at the entire circumference of the facing region.

In an embodiment, the battery pack may further include a rivet for fixing the first metal plate and the metal bridge and fixing the second metal plate and the metal bridge.

In an embodiment, one side of the first metal plate and one side of the second metal plate which face each other may have a tapered shape which is narrowed toward an end thereof.

In another aspect of the present disclosure, there is also provided a battery pack, which includes a plurality of battery modules, each having at least one unit cell, a case for accommodating the unit cell and a bus bar electrically connected to the unit cell; and a connecting bar for connecting battery modules adjacent to each other among the plurality of battery modules, the connecting bar having a melting point of 150 to 300° C.

Preferably, the connecting bar may be made of a lead-free alloy material containing tin (Sn) and copper (Cu) as main components.

Preferably, the connecting bar may have a notch formed in at least a part thereof.

In another aspect of the present disclosure, there is also provided a connecting bar which connects battery modules adjacent to each other among a plurality of battery modules of a battery pack, wherein the connecting bar has a melting point of 150 to 300° C.

Preferably, the connecting bar may be made of a lead-free alloy material containing tin (Sn) and copper (Cu) as main components.

Advantageous Effects

According to the present disclosure, when a protection circuit does not operate normally, causing an overcurrent to flow through a battery pack, a connecting bar is rapidly broken to ensure safety when the battery pack is in use.

In addition, since parts locally heating due to a metal bridge are isolated from an electrode assembly due to a case, it is possible to prevent firing and/or explosion even though heat is applied to break the metal bridge, thereby ensuring safety while a secondary battery is in use.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings in which:

FIG. 7 is a front view showing the battery pack of FIG. 6 where a connection bar is installed at another location;

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

First, a battery pack according to the present disclosure will be described in brief with reference to FIG. 2.

Figure 2:
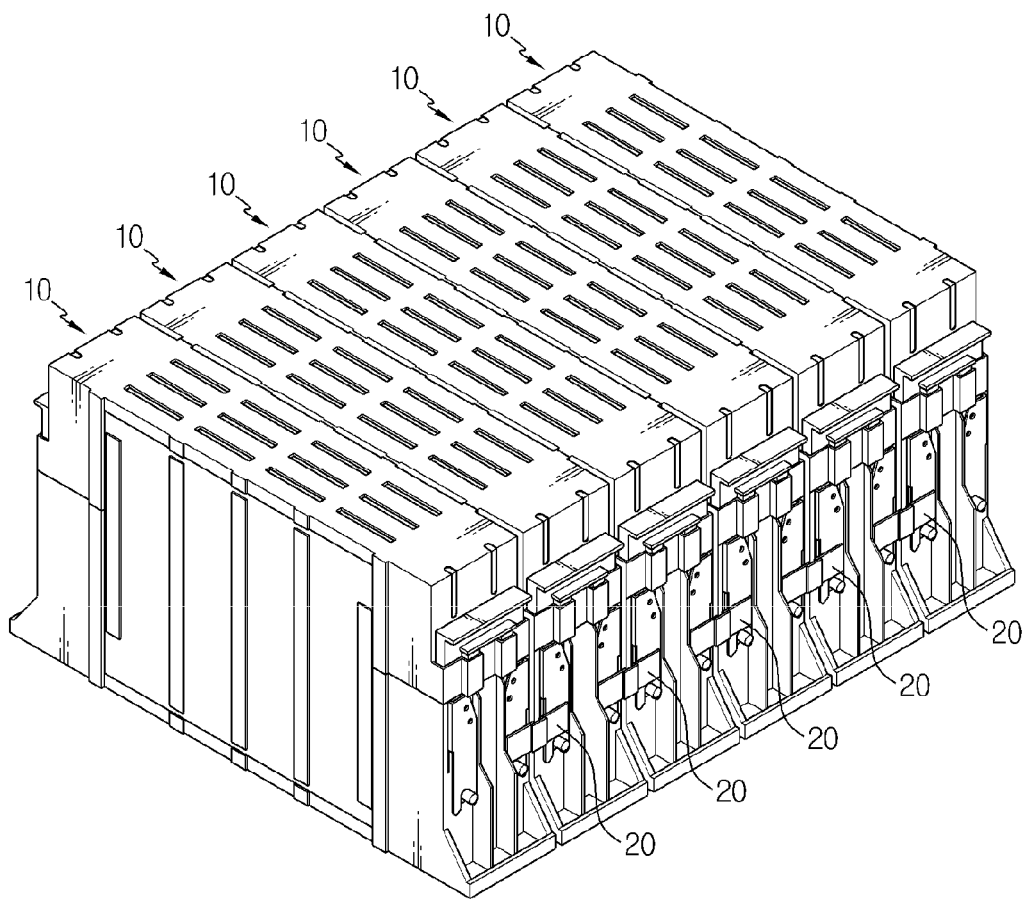
FIG. 2 is a perspective view showing a battery pack according to an embodiment of the present disclosure.

FIG. 2 is a perspective view showing a battery pack according to an embodiment of the present disclosure.

Referring to FIG. 2, the battery pack according to the present disclosure includes a plurality of battery modules 10 and a connecting bar 20. The battery pack may be composed of a plurality of battery modules 10 connected in series or in parallel depending on its use. FIG. 2 of the present disclosure just depicts that six battery modules 10 are connected in series. However, the present disclosure is not limited thereto, and a suitable number of battery modules 10 may be connected in series or in parallel as required.

Next, each battery module 10 of the battery pack will be described with reference to FIGS. 3 to 5.

Figure 3:
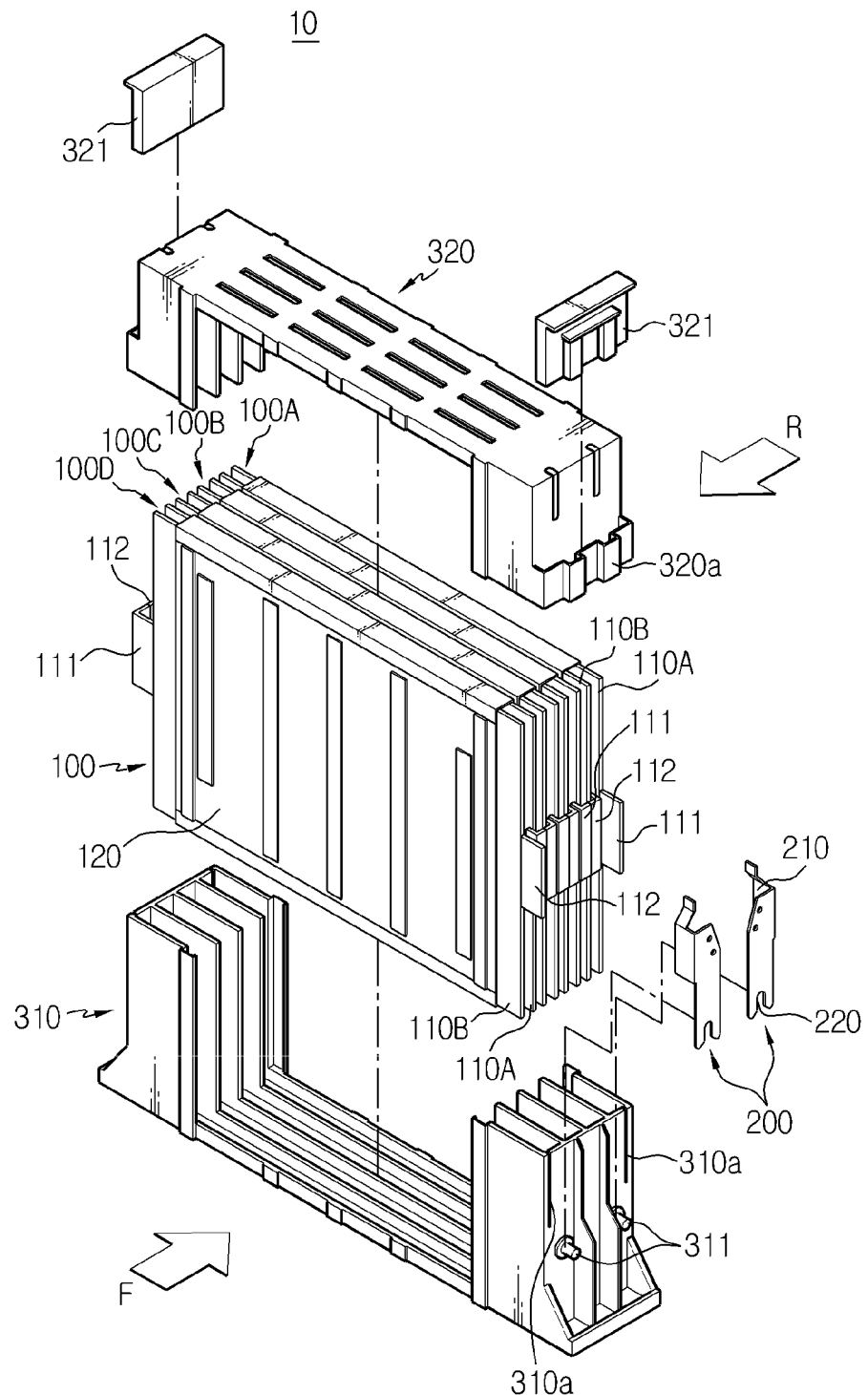
FIG. 3 is an exploded perspective view showing a battery module which configures the battery pack according to an embodiment of the present disclosure.
Figure 4:
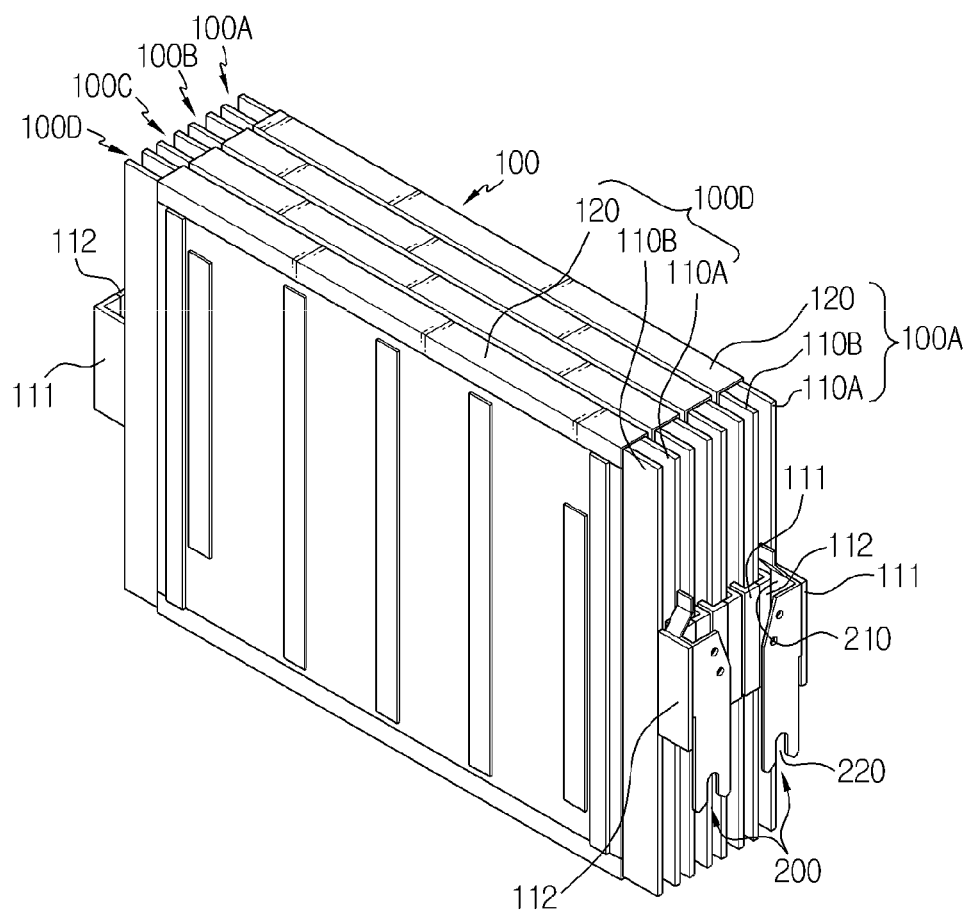
FIG. 4 is a perspective view showing a battery cell of the battery module of FIG. 3, which is coupled to a bus bar.
Figure 5:
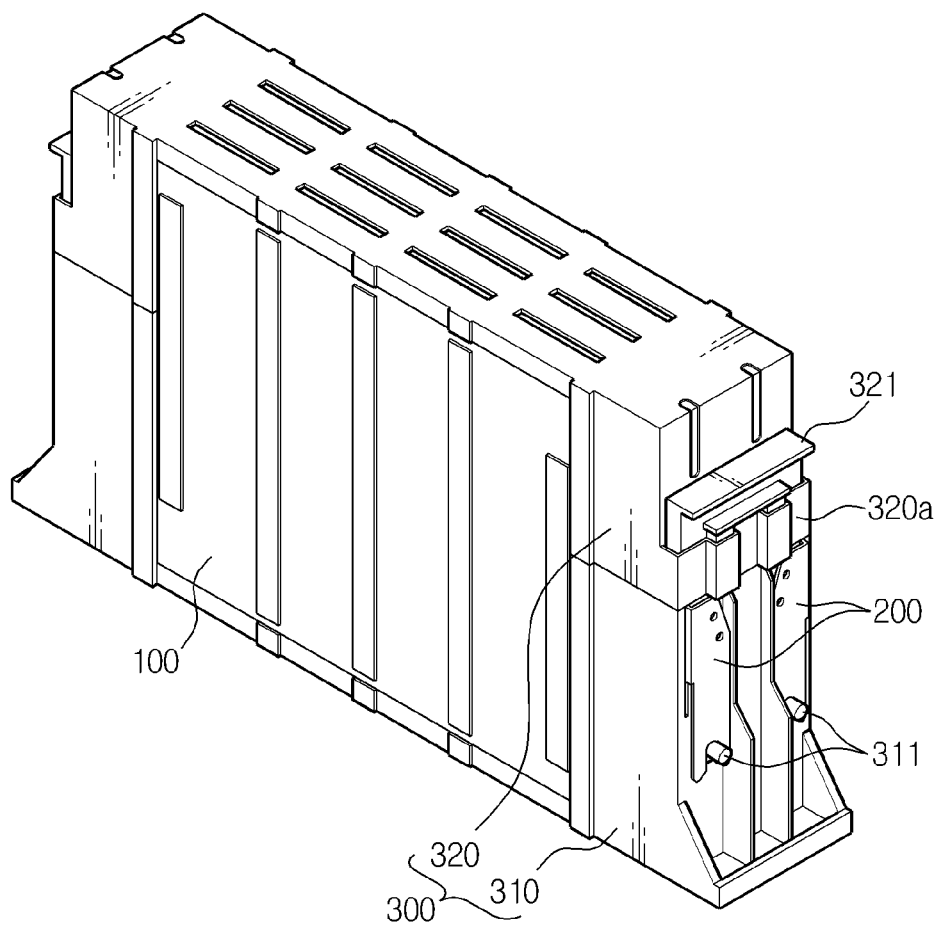
FIG. 5 is a perspective view showing an assembled state of a battery module which configures the battery pack according to an embodiment of the present disclosure.

FIG. 3 is an exploded perspective view showing a battery module which configures the battery pack according to an embodiment of the present disclosure, FIG. 4 is a perspective view showing a battery cell of the battery module of FIG. 3, which is coupled to a bus bar, and FIG. 5 is a perspective view showing an assembled state of a battery module which configures the battery pack according to an embodiment of the present disclosure.

Referring to FIGS. 3 to 5, each battery module 10 includes a battery cell 100, a bus bar 200, a case 300, an external terminal 311 and a voltage sensor 321.

The battery cell 100 is formed by stacking unit modules 100A, 100B, 100C, 100D which are composed of at least one unit cells 110A, 110B and a cell cover 120 surrounding the unit cells 110A, 110B.

The unit cells 110A, 110B includes an electrode assembly (not shown) accommodated in an exterior member and a first electrode lead 111 and a second electrode lead 112 respectively connected to uncoated parts of first and second electrode plates of the electrode assembly and respectively drawn toward one side and the other side of the exterior member. In the present disclosure, the first and second electrode plates are respectively a cathode plate and an anode plate, for example. Accordingly, the first and second electrode leads 111, 112 will be described as cathode and anode leads 111, 112.

In general, the cathode plate is made of aluminum (Al), and the anode plate is made of copper (Cu). Therefore, in aspect of weldability and minimization of electric resistance between the electrode plate and the electrode leads 111, 112, the cathode lead 111 is preferably made of aluminum (Al), identical to the cathode plate, and the anode lead 112 is preferably made of copper (Cu) or nickel (Ni)-coated copper (Cu), identical to the anode plate.

In the case there are a plurality of unit cells 110A, 110B and a plurality of unit modules 100A-100D, the unit cells 110A, 110B and the unit modules 100A-100D may be connected to each other in series or in parallel depending on the use of the battery. However, the present disclosure will be described based on the case of the serial connection. In other words, in the present disclosure, the unit cells 110A, 110B are connected to each other in a way that a cathode lead 111 of a single unit cell 110A is coupled to an anode lead 112 of a unit cell 110B adjacent thereto. In this case, a cathode lead 111 of a unit cell 110A located at the outermost side of the rear surface (in R direction) and an anode lead 112 of a unit cell 110B located at the outermost side of the front surface (in F direction) are respectively coupled to a bus bar 200, described later.

Meanwhile, with regard to the number of the unit cells 110A, 110B and the unit modules 100A-100D, the present disclosure illustrates two unit cells 110A, 110B and four unit modules 100A-100D which are stacked. However, it is just an example, and the number of unit cells 110A, 110B and unit modules 100A-100D is not limited thereto and may be changed depending on the use of a secondary battery.

The bus bar 200 is a metal with a thin plate shape and has a lead coupling portion 210 formed by bending one side therein into an approximately 'L' shape and a terminal groove 220 formed at the other side. The lead coupling portion 210 is coupled to the cathode lead 111 of the unit cell 110A located at the outermost side of the rear surface R of the battery cell 100 and the anode lead 112 of the unit cell 110B located at the outermost side of the front surface F. The terminal groove 220 gives a space into which the external terminal 311 is inserted. The external terminal 311 will be described in detail later.

The bus bars 200 respectively attached to the cathode lead 111 and the anode lead 112 may be made of different materials. In other words, the bus bar 200 attached to the cathode lead 111 is preferably made of aluminum, identical to the cathode lead 111, and the bus bar 200 attached to the anode lead 112 is preferably made of copper or nickel-coated copper, identical to the anode lead 112.

The case 300 accommodates the battery cell 100 and includes a lower case 310 and an upper case 320.

The lower case 310 has an open upper portion, is formed to surround a part of both sides of the battery cell 100 and the lower surface thereof, and has a pair of slits 310a. The slit 310a is formed at a location in one side of the lower case 310, which corresponds to the lead coupling portion 210 of the bus bar 200, and gives a space in which the lead coupling portion 210 is received when the battery cell 100 is inserted into the lower case 310. Therefore, the battery cell 100 and the bus bar 200 may be respectively located at an inner side and an outer side of the lower case 310 while maintaining an electric connection between them.

Meanwhile, an external terminal 311 is provided at a location on one side of the lower case 310, which corresponds to the terminal groove 220 of the bus bar 200, and formed to protrude out of the lower case 310.

The external terminal 311 is sized and shaped corresponding to the terminal groove 220 of the bus bar 200 and gives a space through which the external terminal 311 may be inserted into the bus bar 200 when the battery cell 100 is received in the lower case 310. The external terminal 311 plays a role of electrically connecting an external device (not shown) to the battery cell 100. The external terminal 311 and the bus bar 200 are preferably made of the same material and coupled to each other by welding in aspect of minimization of contact resistance and improvement of coupling force.

The upper case 320 has an open lower portion and is formed to surround a part of both sides of the battery cell 100 inserted into the lower case 310, namely a part of the sides through which the electrode leads 111, 112 are drawn, and an upper surface thereof. The upper case 320 may be coupled to the lower case 310 using a bolt.

The upper case 320 has sensor coupling units 320a at both sides thereof so that the voltage sensor 321 may be inserted therein. The voltage sensor 321 is electrically connected to the battery cell 100 in the sensor coupling unit 320a and senses a voltage of the battery cell 100.

Next, the connecting bar 20 for connecting battery modules 10 adjacent to each other will be described with reference to FIGS. 6 and 7.

Figure 1:
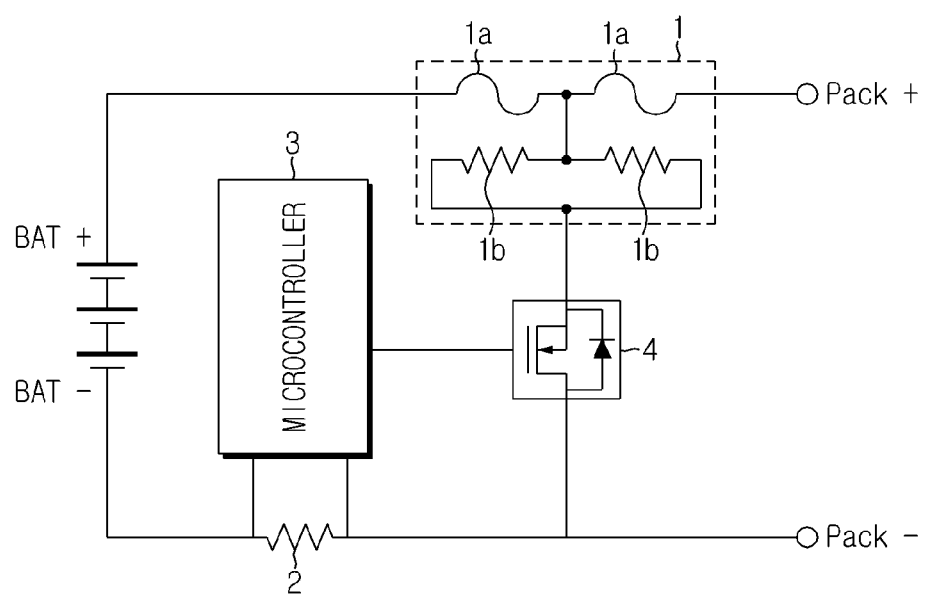
FIG. 1 is a circuit diagram for illustrating an arrangement and an operating mechanism of a fuse element employed in a protection circuit coupled to a battery module.
Figure 6:
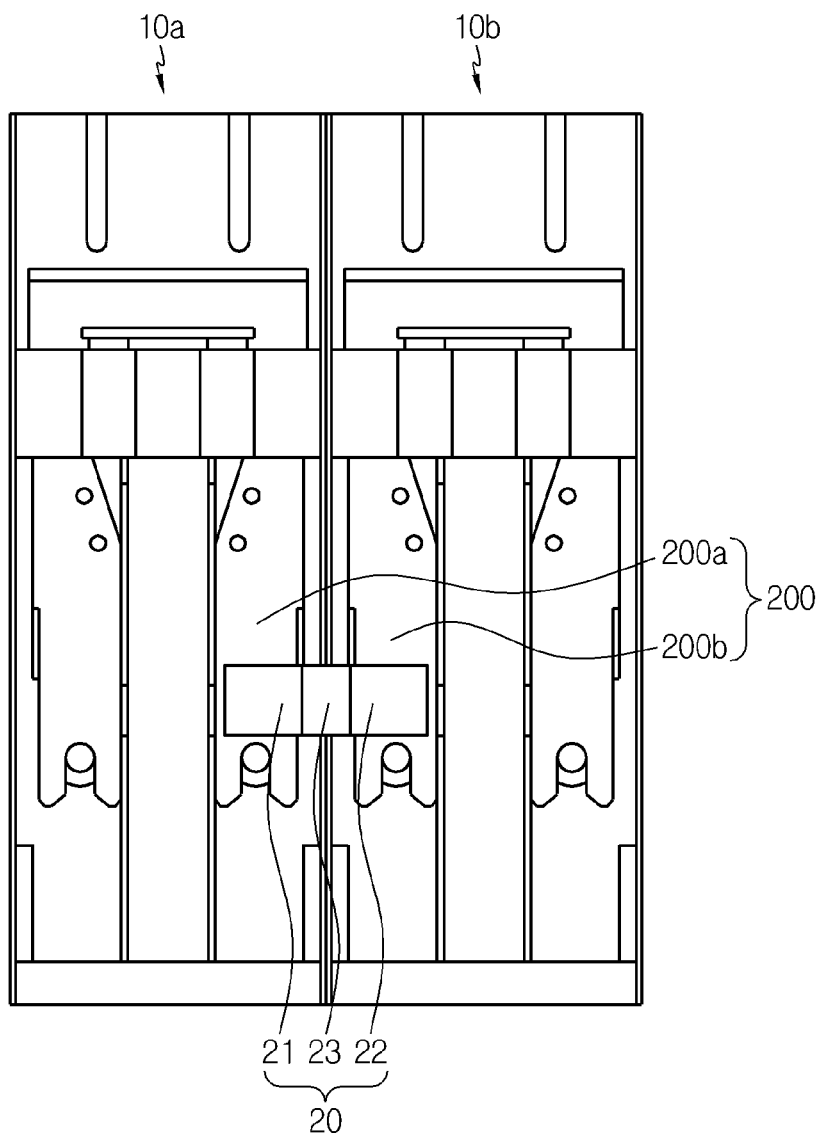
FIG. 6 is a front view showing a part of the battery pack of FIG. 1.

FIG. 6 is a front view showing a part of the battery pack of FIG. 1, and FIG. 7 is a front view showing the battery pack of FIG. 6 where a connection bar is installed at another location.

When describing the connecting bar 20 with reference to FIGS. 6 and 7, two battery modules 10 adjacent to each other will be distinguishably called a first battery module 10a and a second battery module 10b, respectively, for convenience. In addition, a bus bar and an external terminal of the first battery module 10a will be called a first bus bar 200a and a first external terminal 311a, respectively, and a bus bar and an external terminal of the second battery module 10b will be called a second bus bar 200b and a second external terminal 311b, respectively.

Referring to FIG. 6, the connecting bar 20 includes a first metal plate 21, a second metal plate 22 spaced apart from the first metal plate 21 by a predetermined distance, and a metal bridge 23 connecting the metal plates 21, 22 to each other. The connecting bar 20 electrically connects the battery modules 10a, 10b to each other if the first metal plate 21 is coupled to the first bus bar 200a and the second metal plate 22 is coupled to the second bus bar 200b. The first metal plate 21 and the second metal plate 22 are respectively made of the same materials as the first bus bar 200a and the second bus bar 200b, and the metal plates 21, 22 and the bus bars 200a, 200b are preferably coupled to each other by welding. This helps minimize electric resistance and improve a coupling force.

Meanwhile, even though FIG. 6 shows that the battery modules 10a, 10b are connected in series, the present disclosure is not limited thereto. In other words, if the first bus bar 200a and the second bus bar 200b have the same polarity, battery modules 10a, 10b adjacent to each other may be connected in parallel. In addition, serial and parallel connections may be combined.

Referring to FIG. 7, the connecting bar 20 may electrically connect the battery modules 10a, 10b if the first metal plate 21 is coupled to the first external terminal 311a and the second metal plate 22 is coupled to the second external terminal 311b. In this case, similar to FIG. 6, the first metal plate 21 and the second metal plate 22 are preferably made of the same material as the first external terminal 311a and the second external terminal 311b, respectively, and they may be coupled by welding.

The metal bridge 23 is connected between the metal plates 21, 22 by welding, and various connection structures will be described later with reference to FIGS. 8a to 13. Here, roles and properties of the metal bridge 23 will be described.

The metal bridge 23 is fused when the battery pack is overheated, and thus plays a role of releasing an electric connection between the first metal plate 21 and the second metal plate 22. Preferably, the metal bridge 23 is made of a lead-free alloy containing tin (Sn) and copper (Cu) as main components and not containing lead (Pb) which is harmful to environments and human bodies, and has a melting point of about 150 to 300° C. The melting point range is lower than a melting point of a single metal selected from aluminum, copper and nickel-coated copper, which are used for the leads 111, 112 and/or the metal plates 21, 22. Therefore, it is possible to rapidly interrupt the overcurrent.

The melting point range of the metal bridge 23 is determined in consideration of a maximum voltage and a maximum current which the connecting bar 20 should endure, an overcurrent level to be interrupted by the connecting bar 20, and an electric property (resistance) and/or a mechanical property (tensile strength) demanded to the connecting bar 20. If the melting point of the metal bridge 23 is lower than 150° C., the connecting bar 20 may be broken by a current which flows when the battery pack operates normally. In addition, if the melting point of the metal bridge 23 is higher than 300° C., the overcurrent may not be effectively interrupted.

The contents of tin and copper contained in the metal bridge 23 may be suitably adjusted according to the melting point of the metal bridge 23 or the electric property and/or physical property to be endowed to the metal bridge 23 or the connecting bar 20.

Among the components of the metal bridge 23, tin gives an influence on the melting point and tensile strength of the metal bridge 23. For the metal bridge 23 to have a melting point of 150 to 300° C. as well a good tensile strength, the content of tin is adjusted to 80 wt % or above, preferably in the range of 85 to 98 wt %. Here, wt % is a unit based on the entire weight of the materials of the metal bridge 23.

Among the components of the metal bridge 23, copper gives an influence on electric conductivity, melting point and tensile strength of the connecting bar 20, and in consideration of such functions of copper, the content of copper is adjusted in the range of 2 to 20 wt %, preferably in the range of 4 to 15 wt %.

By adjusting the contents of tin and copper as described above, a good tensile strength of the metal bridge 23 may be obtained, and the increase of resistance caused by the metal bridge 23 may be controlled to be lower than several %. Moreover, the melting point of the metal bridge 23 may be adjusted in the range of 150 to 300° C.

Selectively, the metal bridge 23 may further include any one metal selected from nickel (Ni), zinc (Zn) and silver (Ag) in order to improve the electric property and/or mechanical property. The content of the additional metal may be adjusted according to the electric property and/or mechanical property to be endowed to the metal bridge 23, preferably in the range of 0.01 to 10 wt %.

Meanwhile, even though the present disclosure illustrates that the metal bridges 23 are applied to all connecting bars when three or more battery modules 10 are connected (see FIG. 2), the present disclosure is not limited thereto. In other words, if at least one connecting bar 20 to which the metal bridge 23 is applied is used in the battery pack, at least a part of the battery modules may be effectively protected.

As described above, the connecting bar 20 having a dual structure in which the metal plates 21, 22 are connected by the metal bridge 23 is applied to the battery pack according to an embodiment of the present disclosure. Therefore, when an overcurrent occurs, the battery pack may ensure safety when in use since the connecting bar 20 rapidly breaks.

In particular, by applying a current interrupting unit to the connecting bar 20 which is installed at an outer side of the case, the battery pack may further reduce the possibility of firing or explosion in comparison to cases in which the current interrupting unit is applied to a part adjacent to an electrode assembly (not shown), for example the leads 111, 112. In other words, the connecting bar 20 having a dual structure according to the present disclosure induces local heating by increasing an electric resistance by using the metal bridge 23 having a relatively low metal electric conductivity. If this heating phenomenon occurs at a part adjacent to the electrode assembly, the possibility of firing or explosion caused by gas expansion inevitably increases.

Therefore, if a current interrupting unit is applied to a part such as the connecting bar 20 which is isolated from the electrode assembly by the case 300 as in the present disclosure, it is possible to prevent firing and/or explosion caused by heating which is generated for breaking the metal bridge 23, thereby ensuring safety of a secondary battery in use.

Next, various coupling patterns between the metal plates 21, 22 and the metal bridge 23 will be described with reference to FIGS. 8a to 13.

FIGS. 8a to 13 are partial perspective views showing various shapes of the connecting bar employed at the battery pack according to an embodiment of the present disclosure.

Figure 8A:
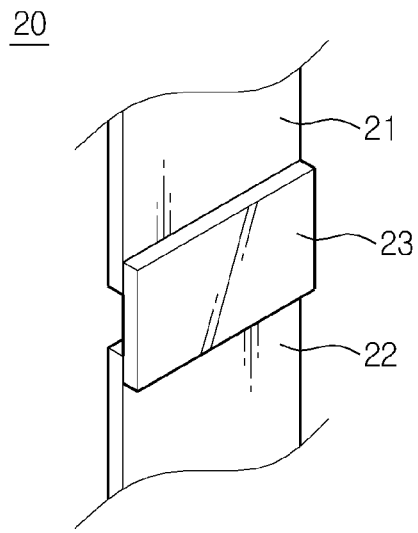
FIGS. 8a to 13 are partial perspective views showing various shapes of the connecting bar employed at the battery pack according to an embodiment of the present disclosure.

Referring to FIG. 8a, the first metal plate 21 and the second metal plate 22 are located on the same plane with a regular gap, and the metal bridge 23 is formed on the upper surfaces of the metal plates 21, 22 and joined to the metal plates 21, 22. FIG. 8a shows that the metal bridge 23 is formed on the upper surfaces of the metal plates 21, 22, but the metal bridge 23 may also be formed on the lower surfaces of the metal plates 21, 22.

Figure 8B:
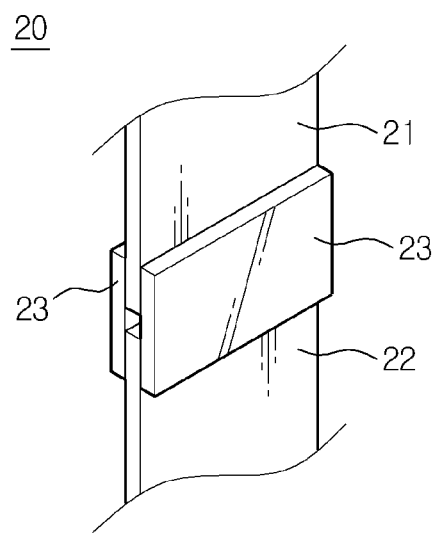

In addition, as shown in FIG. 8b, the metal bridges 23 may be formed on both upper and lower surfaces of the metal plates 21, 22. In this case, the coupling force between the metal plates 21, 22 may be reinforced.

Figure 9A:
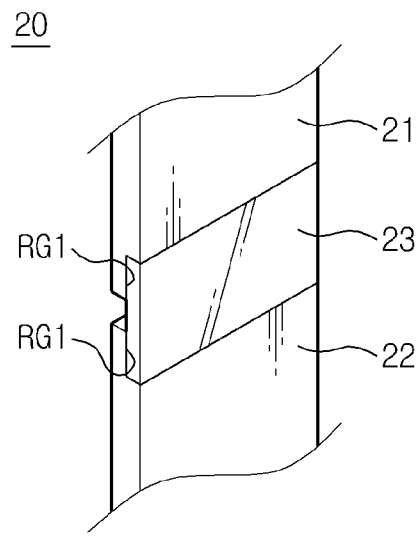

Referring to FIG. 9a, the first metal plate 21 and the second metal plate 22 are located on the same plane with a regular gap and have accommodation grooves RG1 formed in the upper surface thereof at one side end thereof which face each other. Meanwhile, the metal bridge 23 is sized and shaped corresponding to the accommodation grooves RG2 (→RG1), and the metal bridge 23 is accommodated in a space formed by engagement of the accommodation grooves RG1 and joined to the metal plates 21, 22. Even though FIG. 9a shows that the accommodation grooves RG1 are formed only in the upper surfaces of the metal plates 21, 22, the accommodation grooves RG1 may also be formed in both upper and lower surfaces of the metal plates 21, 22.

Figure 9B:
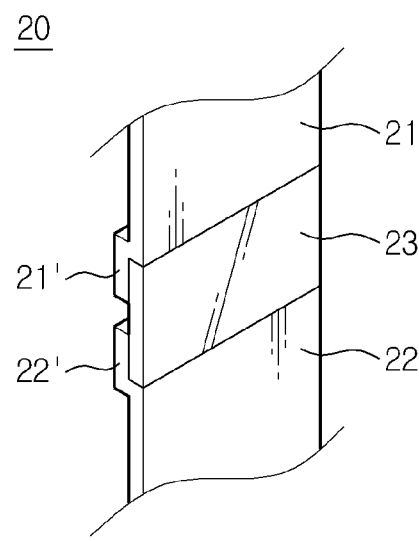

Referring to FIG. 9b, the first metal plate 21 and the second metal plate 22 are located on the same plane with a regular gap and have a first bent portion 21' and a second bent portion 22' formed at one side thereof which face each other. Meanwhile, the metal bridge 23 is accommodated in a space formed by engagement of the first bent portion 21' and the second bent portion 22' and joined to the metal plates 21, 22.

Figure 9C:
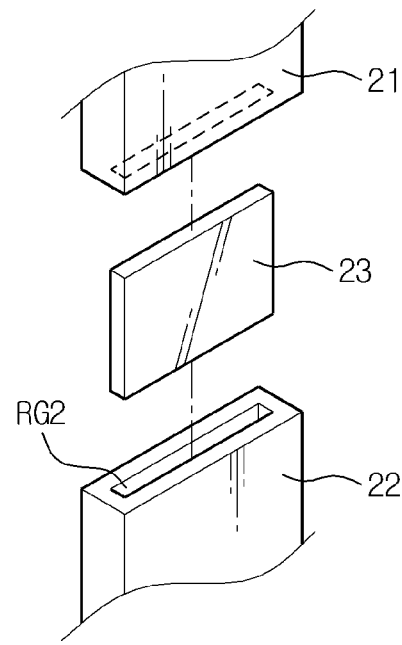

Referring to FIG. 9c, the first metal plate 21 and the second metal plate 22 are located on the same plane with a regular gap and have accommodation grooves RG2 formed with a predetermined depth from surfaces thereof which face each other. Meanwhile, both sides of the metal bridge 23 are inserted into the accommodation grooves RG2 and joined to the metal plates 21, 22.

The structures shown in FIGS. 9a, 9b and 9c reinforce a coupling force between the metal plates 21, 22 and decrease a contact resistance since a contact area between the metal plates 21, 22 and the metal bridge 23 increases, in comparison to the structures shown in FIGS. 8a and 8b.

Figure 10A:
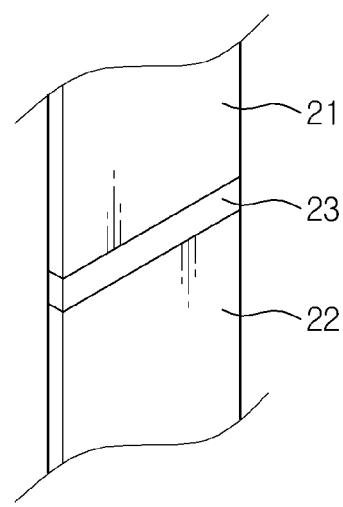

Referring to FIG. 10a, the first metal plate 21 and the second metal plate 22 are located on the same plane with a regular gap, and the metal bridge 23 is directly interposed between surfaces of the metal plates 21, 22 which face each other and joined to the metal plates 21, 22.

Figure 10B:
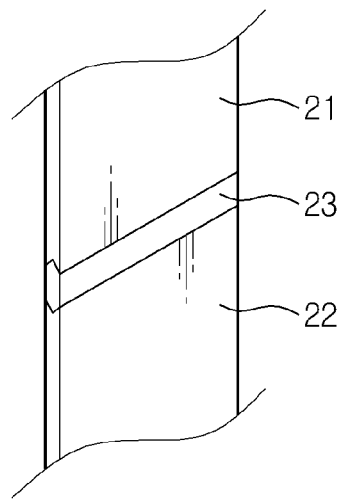

The structure of FIG. 10b is different from the structure of FIG. 10a in the point that surfaces of the metal plates 21, 22 which face each other have an inclined shape tapered toward the metal bridge. In this case, the contact area between the metal plates 21, 22 and the metal bridge 23 increases further, which reinforces a coupling force between the metal plates 21, 22 and decreases a contact resistance.

Figure 11A:
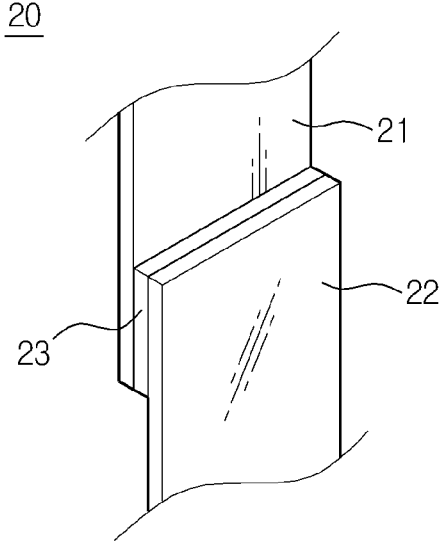

Referring to FIG. 11a, the first metal plate 21 and the second metal plate 22 are located so that one side of the first metal plate 21 and one side of the second metal plate 22 face each other while overlapping each other at least partially, and the metal bridge 23 is interposed in the entire facing region and joined to the metal plates 21, 22.

Figure 11B:
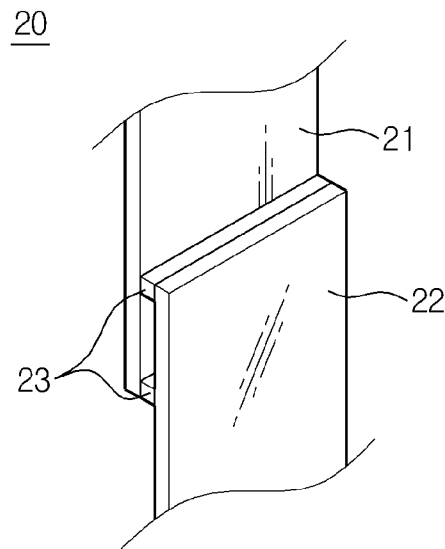
Figure 11C:
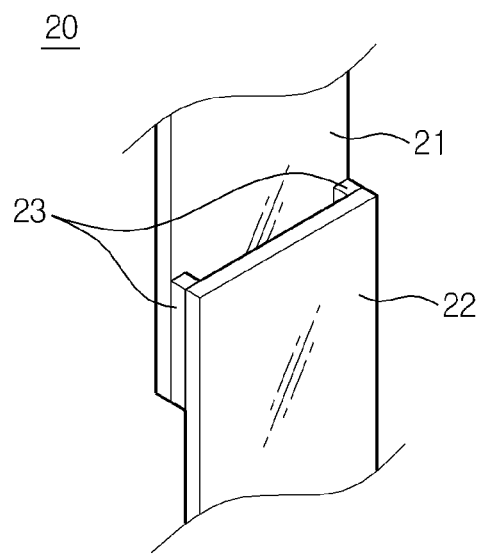

The structures of FIGS. 11b and 11c are different from the structures of FIG. 11a in view of the area of the metal bridge 23 interposed between the metal plates 21, 22. In other words, the metal bridge 23 is formed only at one side and the other side among a circumference of the region where the metal plates 21, 22 faces each other. In this case, when an overcurrent occurs at the battery pack, the connecting bar 20 may be broken rapidly.

Meanwhile, though not shown in the figures, the metal bridge 23 may also be formed at the entire circumference of the facing region. In this case, it is expected that the metal bridge 23 will be broken more rapidly in comparison to the structure of FIG. 11a, and the coupling force between the metal plates 21, 22 will be more excellent in comparison to the structures of FIGS. 11b and 11c.

Figure 12:
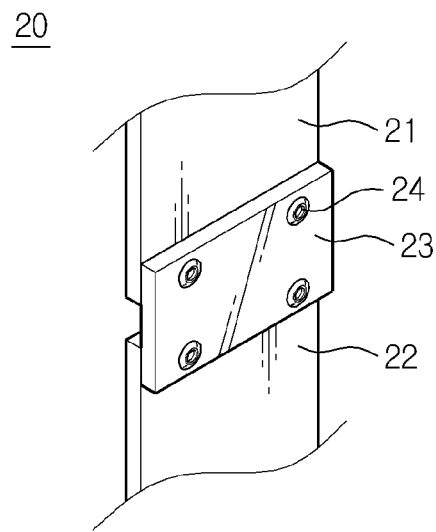

The connecting bar 20 of FIG. 12 is different from the connecting bar 20 of FIG. 8a in the point that a rivet 24 is further formed between the metal plates 21, 22 and the metal bridge 23. The rivet 24 plays a role of enhancing a coupling force between the metal plates 21, 22 and the metal bridge 23.

Meanwhile, even though FIG. 12 shows that the rivet 24 is additionally applied to the connecting bar 20 of FIG. 8a, the present disclosure is not limited thereto. In other words, the rivet 24 may also be applied to the structures of FIGS. 8b to 9c.

Figure 13:
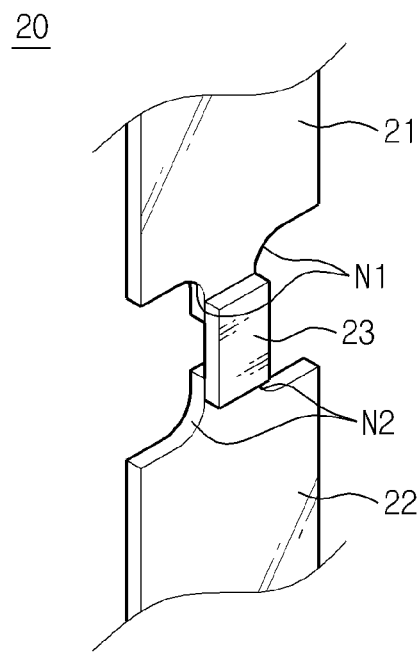

The connecting bar 20 of FIG. 13 is different from the connecting bar 20 of FIG. 8a in the point that one side of the first metal plate 21 and one side of the second metal plate 22 which face each other have tapered portions N1, N2 which are narrowed toward an end thereof. In this case, since electric resistances at the tapered portions N1, N2 increase in comparison to the connecting bar 20 of FIG. 8a, more heat is generated when an overcurrent occurs, and therefore the connecting bar 20 may be broken rapidly.

Meanwhile, even though FIG. 13 shows that the tapered portions N1, N2 are additionally formed at the connecting bar 20 of FIG. 8a, the present disclosure is not limited thereto. In other words, the tapered portions N1, N2 may also be applied to the structures of FIGS. 8b to 11c. In particular, in the case a structure for increasing a contact area between the metal plates 21, 22 and the metal bridge 23 is coupled to the connecting bar 20 of FIG. 13 (see FIGS. 9a to 9c), the connecting bar 20 may be rapidly broken when an overcurrent occurs, the coupling force between the metal plates 21, 22 is excellent, and a contact resistance is low.

Next, a battery pack according to another embodiment of the present disclosure will be described with reference to FIGS. 14a and 14b.

Figure 14A:
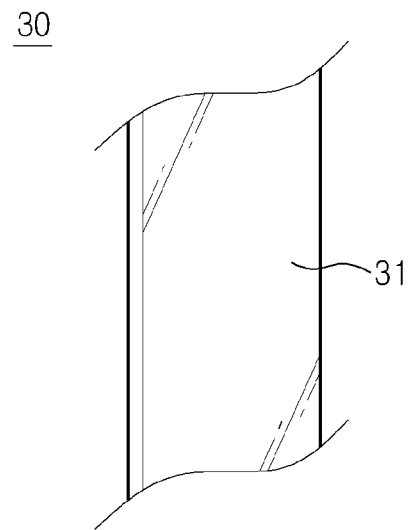
FIGS. 14a and 14b are partial perspective views showing various shapes of a connecting bar employed at a battery pack according to another embodiment of the present disclosure.
Figure 14B:
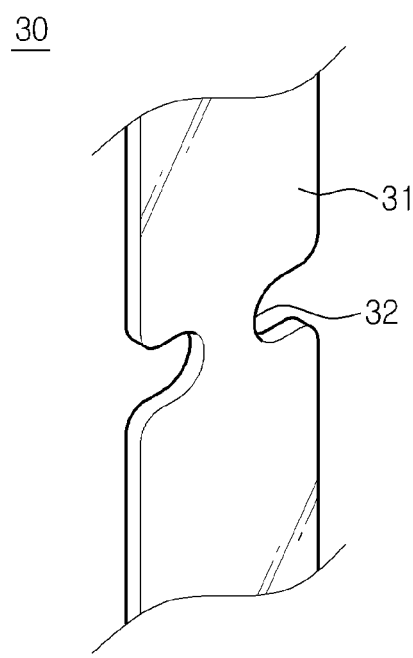

FIGS. 14a and 14b are partial perspective views showing various shapes of a connecting bar 30 employed at a battery pack according to another embodiment of the present disclosure.

Referring to FIG. 14a, the battery pack according to another embodiment of the present disclosure is different from the battery pack of the former embodiment only in the connecting bar 20, and the other components are substantially identical. Therefore, the following description will be focused on the connecting bar 30, and other components will not be described in detail here.

The connecting bar 30 is made of an alloy plate 31 which has the same composition as the metal bridge 23 of the connecting bar 20 of the former embodiment. In other words, the connecting bar 30 has a single structure, instead of the dual structure of the connecting bar 20 of the former embodiment, and the connecting bar 30 is made of the same material as the metal bridge 23 of the former embodiment.

In this case, when an overcurrent flows at the battery pack, not only the center portion of the connecting bar 30 but also a coupling portion thereof coupled with the bus bar 200 or the external terminal 311 may be easily broken, which ensures safety of the battery pack in use.

Referring to FIG. 14b, the connecting bar 30 has a notch 32 formed in at least a part of the alloy plate 31. The notch 32 is formed with a predetermined depth from the outside to the inside in the thickness direction of the alloy plate 31.

The cross section of the alloy plate 31 decreases as much as the depth of the notch 32, and thus a portion where the notch 32 is formed has an increased electric resistance. Therefore, the connecting bar 30 having the notch 32 may be easily broken when an overcurrent flows.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A battery pack, comprising: a plurality of battery modules, each having at least one unit cell, a case for accommodating the at least one unit cell and a bus bar electrically connected to the at least one unit cell; and a connecting bar for connecting battery modules adjacent to each other among the plurality of battery modules, wherein at least one of the connecting bars includes: a first metal plate; a second metal plate spaced apart from the first metal plate; and a metal bridge configured to connect the first metal plate and the second metal plate and having a lower melting point than the first metal plate and the second metal plate, wherein the first metal plate and the second metal plate are located on a same plane and spaced by a gap, wherein the first metal plate and the second metal plate have accommodation grooves formed with a predetermined depth from surfaces thereof which face each other, wherein opposite sides of the metal bridge are respectively inserted into the accommodation grooves and joined to the first metal plate and the second metal plate, and wherein the metal bridge is a flat plate that extends parallel to said same plane.

2. The battery pack according to claim 1, wherein the connecting bar connects bus bars of the battery modules adjacent to each other.

3. The battery pack according to claim 1, further comprising an external terminal installed at one side of the case, wherein the bus bar connects the at least one unit cell and the external terminal.

4. The battery pack according to claim 3, wherein the connecting bar connects external terminals of the battery modules adjacent to each other.

5. The battery pack according to claim 1, wherein the battery modules adjacent to each other are connected in series or in parallel.

6. The battery pack according to claim 1, wherein the metal bridge is a lead-free alloy containing tin (Sn) and copper (Cu) as main components.

7. The battery pack according to claim 6,
wherein the content of the tin is 80 to 98 wt %, and
wherein the content of the copper is 2 to 20 wt %.

8. The battery pack according to claim 7, wherein the metal bridge further includes at least one additional metal selected from the group consisting of nickel (Ni), zinc (Zn) and silver (Ag).

9. The battery pack according to claim 8, wherein the content of the additional metal is 0.01 to 10 wt %.

10. The battery pack according to claim 1, wherein the metal bridge has a melting point of 150 to 300° C.

11. The battery pack according to claim 1, where the flat plate of the metal bridge is solid.

* * * * *